United States Patent [19]

Chung

[11] Patent Number: 5,212,584
[45] Date of Patent: May 18, 1993

[54] TUNABLE ETALON FILTER
[75] Inventor: Yun C. Chung, Aberdeen, N.J.
[73] Assignee: AT&T Bell Laboratories, Murray Hill, N.J.
[21] Appl. No.: 875,873
[22] Filed: Apr. 29, 1992
[51] Int. Cl.$^5$ .......................... G02F 1/07; G02F 1/01; G02B 27/00; G02B 1/10
[52] U.S. Cl. .................... 359/260; 359/288; 359/579; 359/586; 359/588
[58] Field of Search .............. 359/260, 288, 289, 578, 359/579, 582, 586, 588

[56] References Cited

U.S. PATENT DOCUMENTS 4,782,492 11/1988 McMahon et al. .................. 359/288

OTHER PUBLICATIONS

"Electrically Tunable Optical Filter for Infrared Wavelength Using Liquid Crystals in a Fabry-Perot Etalon" J. S. Patel, et al., Appl. Phys Lett 57 (17) 22 Oct. 1990, pp. 1718-1720.

"Angle-Tuned Etalon Filters for Optical Channel Selection in High Density Wavelength Division Multiplexed Systems" A. Frenkel and C. Lin, J. Lightwave Tech., vol. 7, No. 4 Apr. 1989 pp. 615-624.

Primary Examiner—Bruce Y. Arnold
Assistant Examiner—Evelyn A. Lester
Attorney, Agent, or Firm—E. Weiss

[57] ABSTRACT

A tunable etalon filter is formed by placing mirrors on either side of a spacer of a material which has a relatively large rate of change of refractive index with temperature, and coupling the filter to a thermoelectric cooler to control the temperature of the spacer and, therefore, the index of refraction of the spacer. More specifically, the spacer can be a silicon wafer, or a wafer of zinc sulfide or zinc selenide. The mirrors can be formed of quarter wavelength layer pairs of dielectric coatings of high and low refractive index material. The thermoelectric cooler, which can be coupled to a heat sink, controls the temperature of the spacer by either heating or cooling the spacer. In operation the filter is coarse tuned by adjusting its angle relative to the angle of a received optical signal. It is then fine tuned to the signal by adjusting the temperature of the spacer. The advantages of this filter are: large tunability by angle tuning; fine tuning by temperature; large free-spectral-range; narrow passband; low insertion loss; and high reliability.

19 Claims, 7 Drawing Sheets

TUNABLE ETALON FILTER

TECHNICAL FIELD

This invention relates to the field of optical filters and, more particularly, to a tunable etalon filter.

BACKGROUND OF THE INVENTION

Tunable optical filters are required for selecting channels in wavelength-division-multiplexed optical communication systems. In addition to being used to select channels, they play an important role in filtering out noise in amplified wavelength-division-multiplexed systems incorporating optical amplifiers.

When used in these applications, the tunable optical filters should have specific desired characteristics such as a large tunability, a narrow passband, low insertion loss; be able to be locked to the transmitter signal easily, be reliable, be cost-effective, and the like.

At the present time there are various optical filters which have some or most of the above noted desired characteristics, such as, for example: A) a fiber Fabry-Perot interferometer; B) an angle-tuned etalon filter, C) a liquid-crystal etalon filter; D) a Ti:LiNbO3 electro-optic wavelength filter, and E) DFB or DBR active optical filter.

This list, which is not complete, is representative of the many different types of optical filters that are presently known. While some of them may have many of the desired characteristics identified above, not one of them satisfies all of the desired characteristics. The characteristics of these filters are compared in detail in other references (for example, "Angle-tuned etalon filters for optical channel selection in high-density wavelength division multiplexed systems", J. Lightwave Technol., vol. 7, pp. 615-624, 1989).

This invention is an optical filter which has all of the desired characteristics noted above.

SUMMARY OF THE INVENTION

In this invention, a tunable etalon filter is formed by placing the mirrors on either side of a spacer of a material which has a relatively large rate of change of refractive index with temperature, and coupling the filter to a temperature control means to control the temperature and, therefore, the index of refraction of the spacer. More specifically, the spacer located between the two mirrors can be a silicon wafer, or of zinc sulfide or zinc selenide or the like. The mirrors can be formed of quarter wavelength layer pairs of dielectric coatings of high and low refractive index material. The temperature control means can be a thermoelectric cooler coupled to a heat sink to control the temperature of the spacer by either heating or cooling.

The filter is coarse tuned to a desired channel by adjusting its angle relative to the angle of the received optical signal. It is then locked to the transmitter signal by adjusting the temperature of the spacer.

DETAILED DESCRIPTION

Figure 1:
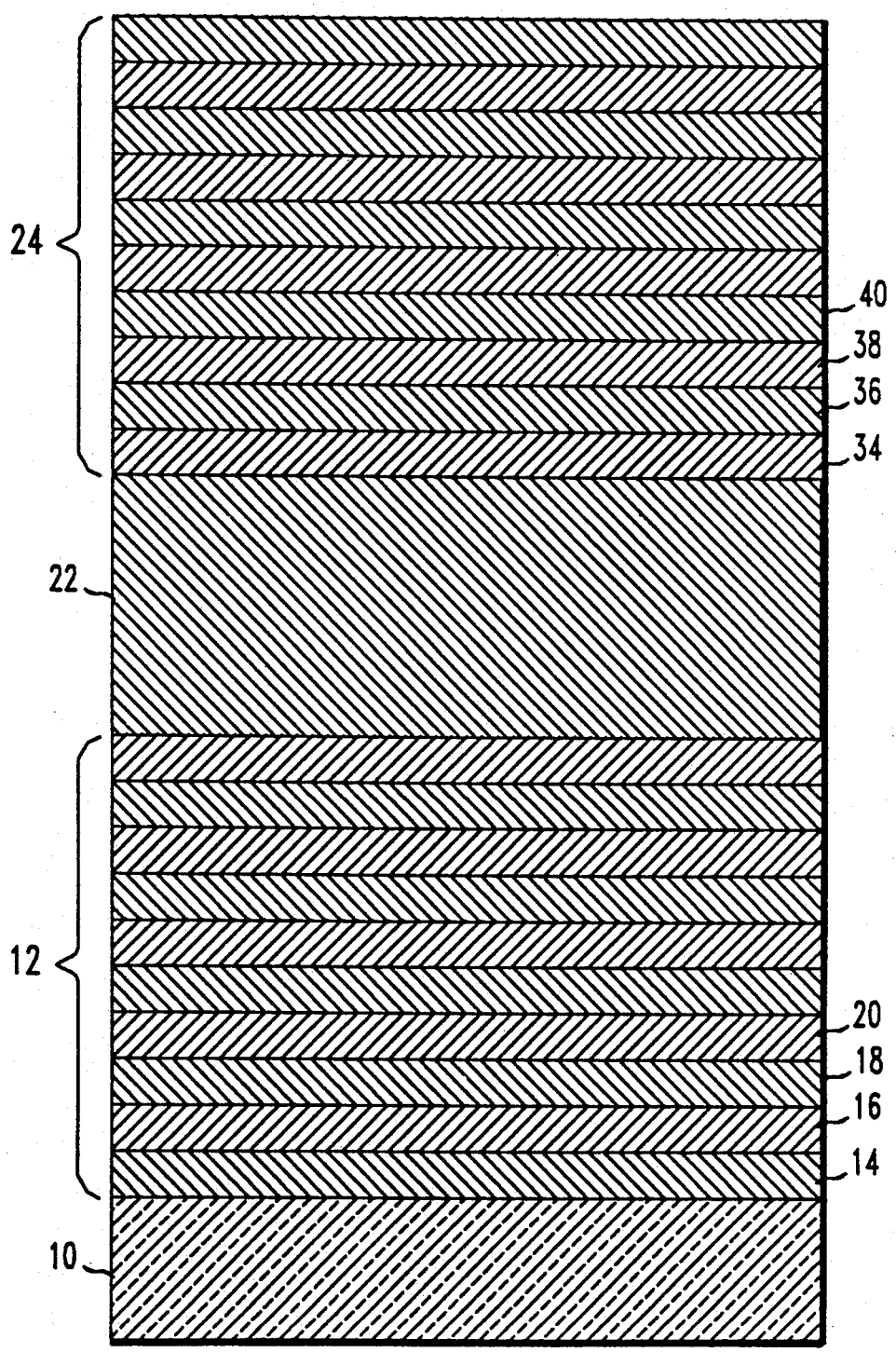
FIG. 1 illustrates an etalon filter based on ZnS having multilayer dielectric coatings on a quartz substrate in accordance with the principles of the invention.

Disclosed herein is an etalon filter which is formed with a spacer which has a relatively large rate of change of refractive index with temperature. The temperature-tuned filter disclosed can be roughly tuned to a desired channel by adjusting its angle, and then locked to the transmitter signal by varying its temperature. This filter has a large free-spectral-range, a narrow passband, and relatively low insertion loss. Thus, the temperature-tuned filter disclosed can be used for channel selection and noise filtering in amplified wavelength-division-multiplexed systems using optical amplifiers.

A Fabry-Perot etalon consists of two partially transmitting mirrors facing each other. It is the simplest of all interferometers. A lightwave which enters a Fabry-Perot etalon filter undergoes multiple reflection between the mirrors, which in turn, causes interference between the transmitted and reflected beams. When the resonant wavelength of a Fabry-Perot etalon is adjusted to be the same as the transmitter laser wavelength for channel selection, a constructive interference occurs and the transmission becomes maximum. The resonant wavelength, λ, depends on the optical path length, which can be determined by three parameters: the refractive index, mirror spacing, and the incident angle. It is represented by the following relationship.

$$\lambda = \frac{2nl\cos\theta}{m} \quad (2)$$

where n is the refractive index, l is the mirror spacing, $\theta$ is the internal incident angle, and m is the mode number. Previously, the mirror spacing l and the angle $\theta$ have been commonly used for tuning in lightwave systems applications. However, except for liquid crystal etalon filters (Appl. Phys. Letters 57 (17), Oct. 22, 1990, pp. 1718–1720), the refractive index n has not been explored for etalon filters.

In this invention, the filter is tuned by changing the refractive index n with temperature.

When the refractive index and the mirror spacing are subject to temperature variation, the temperature dependence of these parameters can be given by $$n = n_o + \alpha T \quad (2a)$$

$$l = l_o(1 + \beta T) \quad (2b)$$

where, $n_o$ and $l_o$ are the refractive index and the mirror spacing at 0° C., respectively. $\alpha$ is the temperature coefficient of the refractive index, $\beta$ is the thermal expansion coefficient, and T is the temperature. Thus, the temperature-induced tuning of an etalon filter can be estimated by $$d\lambda = \lambda_o \left[ \frac{\alpha}{n_o} + \beta \right] dT \quad (3)$$

where, $\lambda_o$ is the resonant wavelength at 0°/C. Thus, to provide broad range tuning with temperature, an etalon filter should be constructed with a spacer which has a large $\alpha$ and $\beta$. In addition, the spacer should be transparent in the spectral range of interest (1.5 μm) for the use in lightwave systems applications. In most optical materials, the $\alpha$ has the dominant effect. The table below shows the temperature coefficients of refractive index of some materials which are transparent at 1.5 μm region.

| TEMPERATURE COEFFICIENTS OF REFRACTIVE INDICES | | |
|---|---|---|
| MATERIAL | INDEX | dn/dT($10^{-5}$/°C.) |
| Crystal quartz | 1.528 | −0.55 |
| Fused Silica | 1.444 | 1.16 |
| ZnS | 2.27 | 4.2 |
| ZnSe | 2.40 | 6.4 |
| Silicon | 3.48 | 13.56 |
| Cesium iodide | 1.749 | 970 |

These values of refractive indices are for the 1.5 μm spectral region.

In general, materials such as silicon (Si), zinc sulfide (ZnS), and zinc selenide (ZnSe) have desirable characteristics. Using the equation (3) and the values listed in the table above, the temperature-tunabilities of etalon filters are calculated to be, for example, about 0.42 Å/°C. for ZnS filters and 0.65 Å/°C. (8 GHz/°C.) for Si filters. Even with a very primitive thermal design, the temperature of an etalon filter mounted on a thermoelectric cooler can be changed more than 60° C./amphere. Thus, the temperature-tunabilities of ZnS and Si filters can also be expressed as 25 Å/smpere and 39 Å/ampere, respectively. In practice, the temperature-tunabilities were measured to be about 0.4 Å/°C. for filters with a spacer made out of ZnS and about 0.85 angstrom/°C. for filters with a spacer made out of Si. When the current in a thermoelectric cooler (TE) used to control the temperature of the spacer was swept ±1.7 amperes, the ZnS and Si filters were tuned over a range of 82 Å and 170 Å, respectively. Although some materials such as cesium iodide have extremely large temperature coefficient of refractive index, these materials can be easily cracked due to the large thermal expansion and low thermal conductivity. In addition, they are water and alcohol soluble, soft and extremely hydroscopic, thus not well suited for the use as a spacer in an etalon filter.

The performance of a filter in a wavelength-division-multiplexed system can be characterized by the crosstalk caused by adjacent channels. For an etalon filter, crosstalk depends on the free-range and finesse and is represented by the following equation:

$$C(dB) = -10 \log \left[ 1 + 4 \left[ \left( \frac{F}{\pi} \right) \sin \left( \frac{\pi S}{FSR} \right) \right]^2 \right] \quad (4)$$

where, C is the crosstalk, F is finesse, S is the spacing between channels, and FSR is the free-spectral-range.

When the filter is used to select a channel in a wavelength-division-multiplexed system with more than two equally spaced channels, the crosstalk will be approximately 3 dB higher than the one given by this equation.

A most important design rule for an etalon filter is to suppress the crosstalk to a value that is lower than 20 dB to avoid any significant penalty in the receive sensitivity. The channel spacing S is a fixed parameter for a given system. Thus, it is necessary to increase the finesse and decrease the FSR to suppress the crosstalk. However, the FSR of an etalon filter should be larger than the system bandwidth to select any desired channels. In amplified lightwave systems incorporating erbium-doped fiber amplifiers, the bandwidth is limited to about 30 nm which is the gain bandwidth of erbium-doped fiber amplifiers. In long-distance lightwave transmission systems which incorporate concatenated fiber amplifiers, the 3-dB bandwidth of the system is significantly reduced to only a few nanometer. Thus, the finesse should be adjusted to suppress the crosswalk for the given channel spacing and free-spectral-range. The higher finesse will be needed for larger free-spectral-range and narrower channel spacing. The temperature-tuned etalon filter here disclosed can be easily constructed to satisfy these system requirements.

Referring to FIG. 1, there is illustrated a tunable etalon filter based on ZnS in accordance with the principle of the invention.

On a substrate 10 which can be composed of quartz glass having a thickness of about 0.25 mm, there is formed a first mirror 12 which can be five pairs of dielectric coatings of ZnS/ThF$_4$ where each dielectric coating or layer in a quarter wavelength thick. More specifically, the first mirror 12 can be formed by depositing a first layer 14 of ZnS onto the substrate 10, a second layer 16 of ThF$_4$ onto the layer 14, a third layer 18 of ZnS onto the layer 16, a fourth layer 20 of ThF$_4$ onto the layer 18, and so on until fine pairs of layers have been deposited. The material ZnS has an index of refraction of substantially 2.27; and the material ThF$_4$ has an index of refraction of substantially 1.45.

As noted above, the five pairs of quarter wavelength layers form a first mirror. Onto the surface of the last deposited layer, there is formed a spacer 22 which has a relatively large temperature coefficient of refraction index. Spacer 22 is substantially 16.5 μm thick and can comprise one hundred dielectric coatings of quarter wavelength layers of ZnS. The second mirror 24 is formed on the top surface of the spacer 22. The second mirror 24 is made up of five pairs of dielectric coatings of ZnS/ThF$_4$ where each dielectric coating or layer is a quartz wavelength thick. More specifically, onto the top surface of the spacer 22 a layer 34 of ThF$_4$ is deposited; thereafter, a layer 36 of ZnS is deposited. On top of layer 36, a layer 38 of ThF$_4$ is deposited, and then a layer 40 of ZnS is deposited. This is continued until five pairs of layers have been formed.

The mirror reflectivity is estimated to be about 95%; and, the free-spectral range and the passband at FWHM were measured to be 30 nm and 0.46 nm respectively. Higher reflectivity of the mirror can be achieved by adding more quater-wave layers to the mirror stack.

Figure 2:
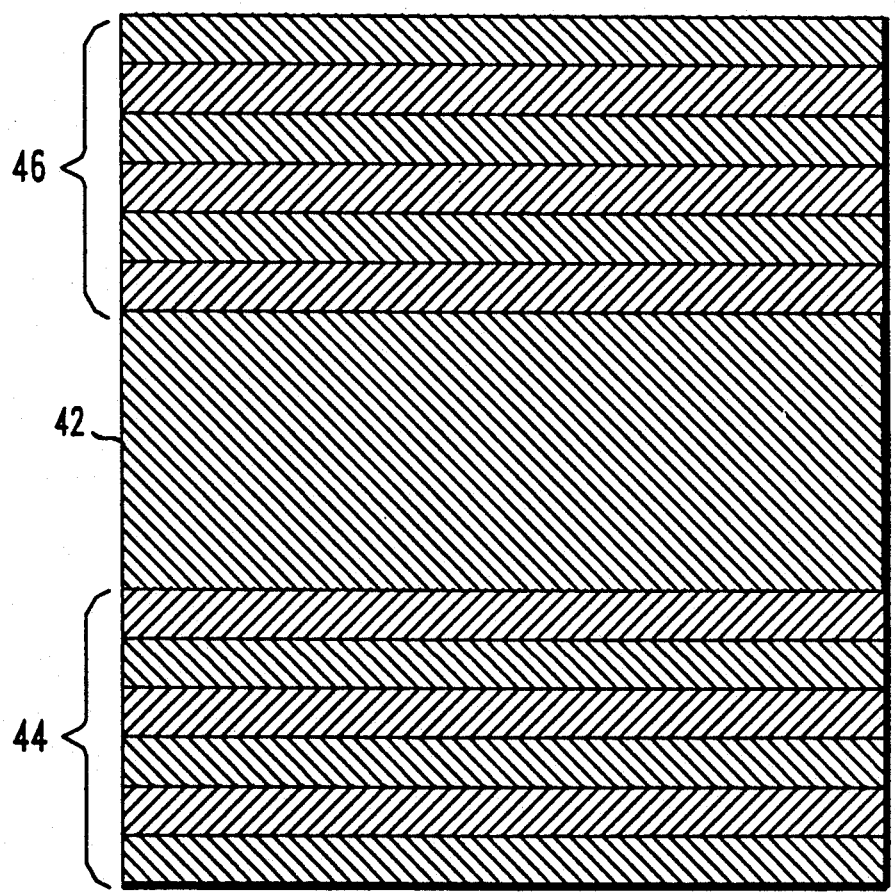
FIG. 2 illustrates an etalon filter based on Si illustratively used in the invention.

Referring to FIG. 2, there is illustrated a tunable etalon filter based on Si. This filter does not require a substrate. The filter 40 consists of a Si wafer 42 positioned between a first mirror 44 and a second mirror 46. The Si wafer 42 can have a thickness of substantially 20

μm and is polished at both surfaces. The thickness can be adjusted for the desired free-spectral length. The first mirror 44 can be formed of three, one-quarter wavelength layer pairs of dielectric coatings of Si and SiO₂; and the second mirror 46 can be made of a similar number of one-quarter wavelength layer pairs of dielectric coatings of Si and SiO₂. The Si layer, which is a quarter wavelenght thick, has an index of refraction of substantially 3.48; and the SiO₂ layer, which is also a quarter wavelength thick has an index of refraction of substantially 1.44. The reflectivity of the mirrors is estimated to be substantially 95% and the free spectral range is determined to be substantially 17 nm.

Figure 3:
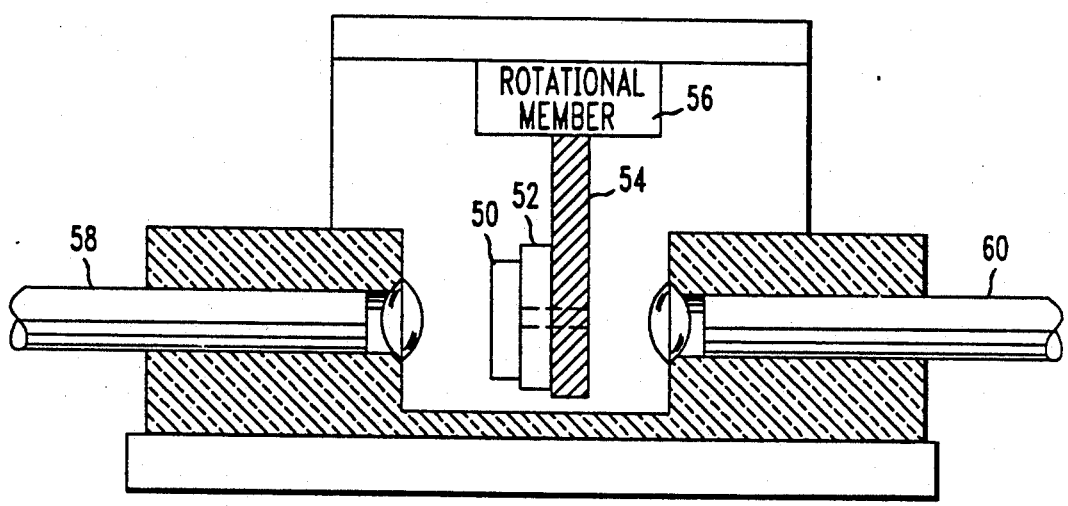
FIG. 3 illustrates a structure for operating the inventive tunable etalon filter.

FIG. 3 illustrates structure for using the inventive tunable etalon optical filter to select a channel of a wavelength division multiplexed signal of many channels. The filter 50 is mounted onto a thermoelectric (TE) cooler 52 which is attached to a copper heat sink 54. The copper heat sink is coupled to a rotational drive member 56. The rotational drive member 56 is controlled, either manually or remotely, to angularly position the filter to a predetermined angle relative to the longitudinal axis of an optical fiber 58 positioned to direct an optical signal to the filter 50. This angle can be permanently fixed, if desired, once it is set to the predetermined angle. The thermoelectric coller and copper heat sink have a 4 mm diameter hole positioned to allow the optical signal passed by the filter 50 to be received by an optical fiber 60.

In an application, the ZnS based etalon filter was tuned 38 nm (1.511-1.549 μm) by changing the external incident angle (the angle of the filter relative to the longitudinal axis of the optical fiber) 30 degrees. Clearly, the filter can be tuned to a desired optical frequency with a small change of the incident angle. Thereafter, the filter can be locked to the transmitter signal by controlling its temperature. The transmission wavelength of the filter changes with temperature due primarily to the change of the refractive index of the ZnS spacer. The thermal expansion of the spacer has negligible effect.

Figure 4:
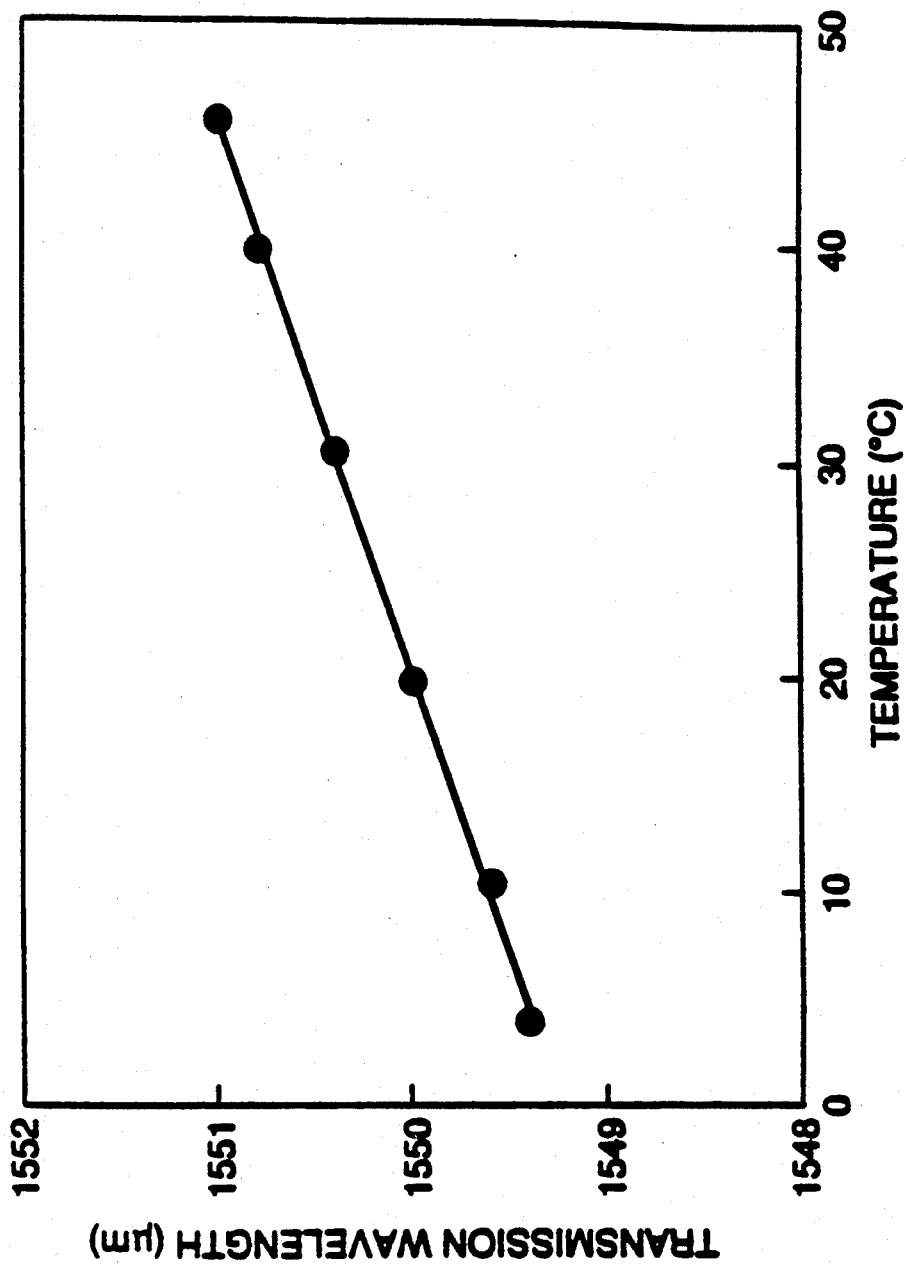
FIG. 4 illustrates a plot of transmission wavelength measured as a function of temperature for an etalon filter based on ZnS of FIG. 1.

Referring to FIG. 4, there is illustrated transmission wavelength measured as a function of temperature. The plot shows that the ZnS etalon filter tuned about 5 GHz/°C. The temperature of the ZnS etalon filter changed about 60° C./amperes applied to a thermoelectric (TE) cooler. When the current in the thermoelectric cooler was changed ±1.7 amperes, the ZnS filter was tuned over a range of 8.2 nm.

In one application the filter was locked to as transmitted signal using a digital servoloop. The servoloop was coupled to monitor the photocurrent and maximize the transmission by adjusting the temperature of the filter. The transmission of the filter was stable. When the wavelength of the transmitter laser was intentionally changed by as much as 1 nm, the drift of the filter was less than 3%.

Figure 5:
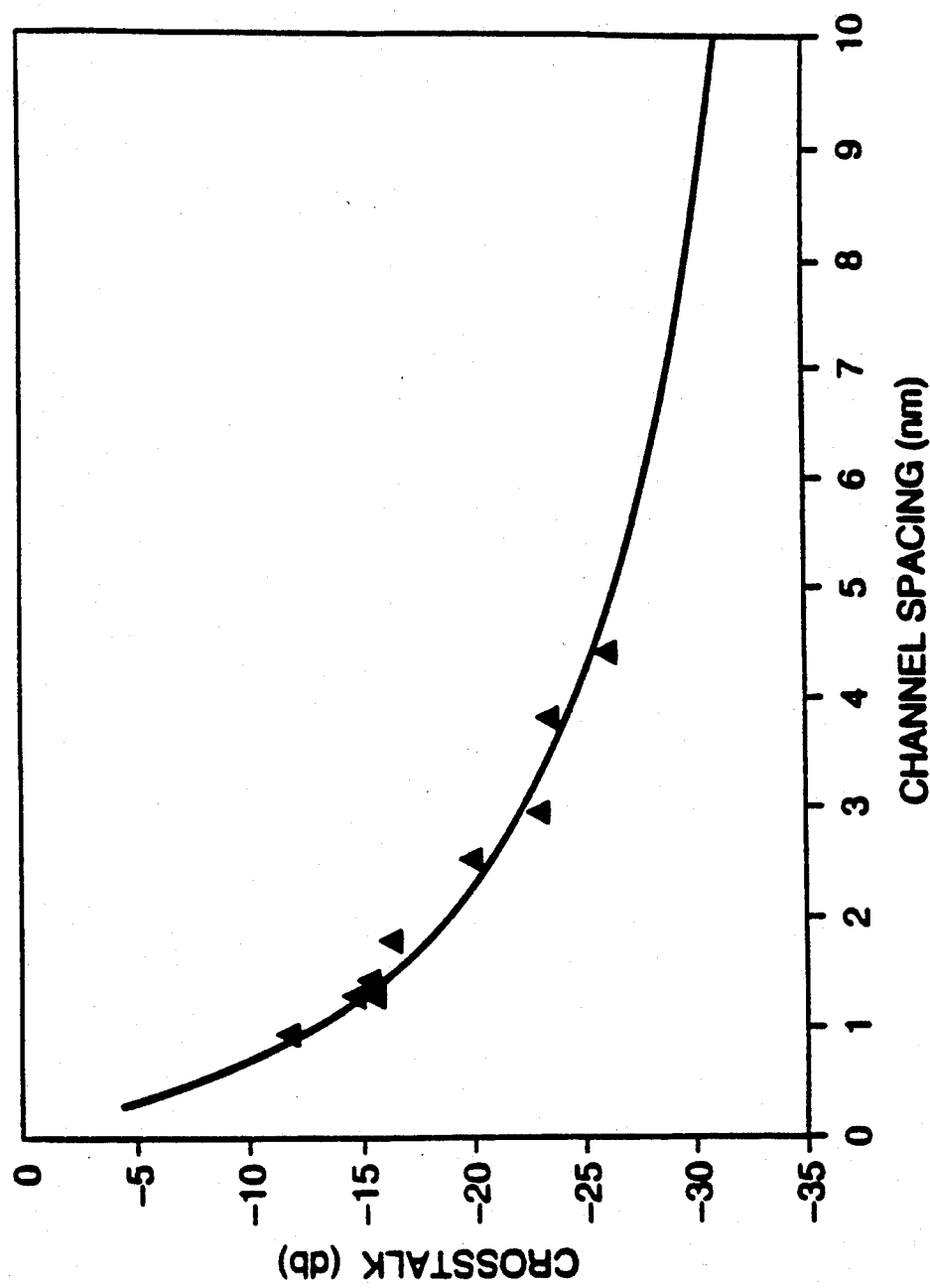
FIG. 5 illustrates the measured crosstalk versus channel spacing in a two channel 1.5 μm wavelength-division-multiplexed system using the filter of FIG. 1.

FIG. 5 illustrates the measured crosstalk versus channel spacing in a two-channel 1.5 μm wavelength division multiplexed optical communication system. The result shows that the filter is well suited for use in a system with a channel spacing of about 2 nm or larger, where the crosstalk is less than −20 dB.

Figure 6:
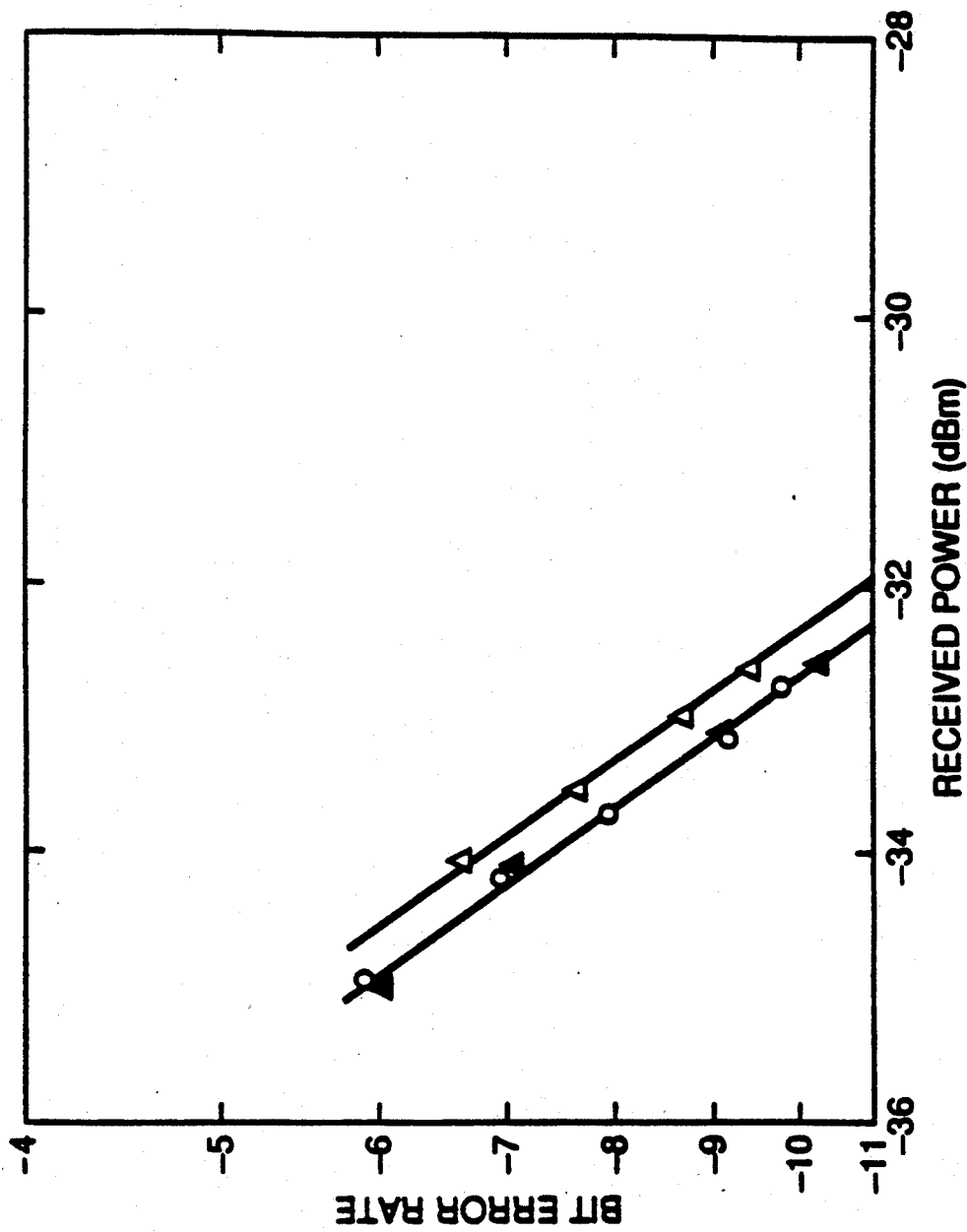
FIG. 6 illustrates the bit-error-rate curves measured at two different channel spacing of a wavelength-division-multiplexed systems using the filter of FIG. 1 for channel selection.

FIG. 6 illustrates the bit-error-rate curves measured at two different channel spacings. Both channels were modulated at 1.7 Gb/s (pattern length $2^{15}-1$). No degradation was observed in the receiver sensitivity when the channel spacing was around 2 nm or greater. When the channel spacing was reduced to 1.3 nm, the power penalty due to crosstalk was measured to be about 0.3 dB.

In summary, there is disclosed a temperature-tuned etalon filter which has a relatively large free spectral range, a narrow passband and a relatively low insertion loss. The temperature tuned filter can be used for channel selection and noise filtering in amplified wavelength division multiplexed systems. The advantages of these filters are as follows: 1) large tunability by angle-tuning; 2) easy control of the transmission wavelength by means of temperature; 3) large free-spectral-range; 4) narrow passband; 5) low insertion loss; 6) reliability; and 7) is cost-effective.

The filter was constructed using multilayer dielectric coatings. The ZnS filter tuned about 5 GHz/°C.(0.4 Å/°C.), and the free-spectral-range and passband at FWHM were 30 nm and 4.6 Å respectively. The filter can be locked to a transmitter signal using a digital servoloop, and the transmission can be maintained to within 3% of the maximum. The filter can be used for channel selection (demultiplexing) in wavelength division multiplexed systems without degradation in the receiver sensitivity.

Figure 7:
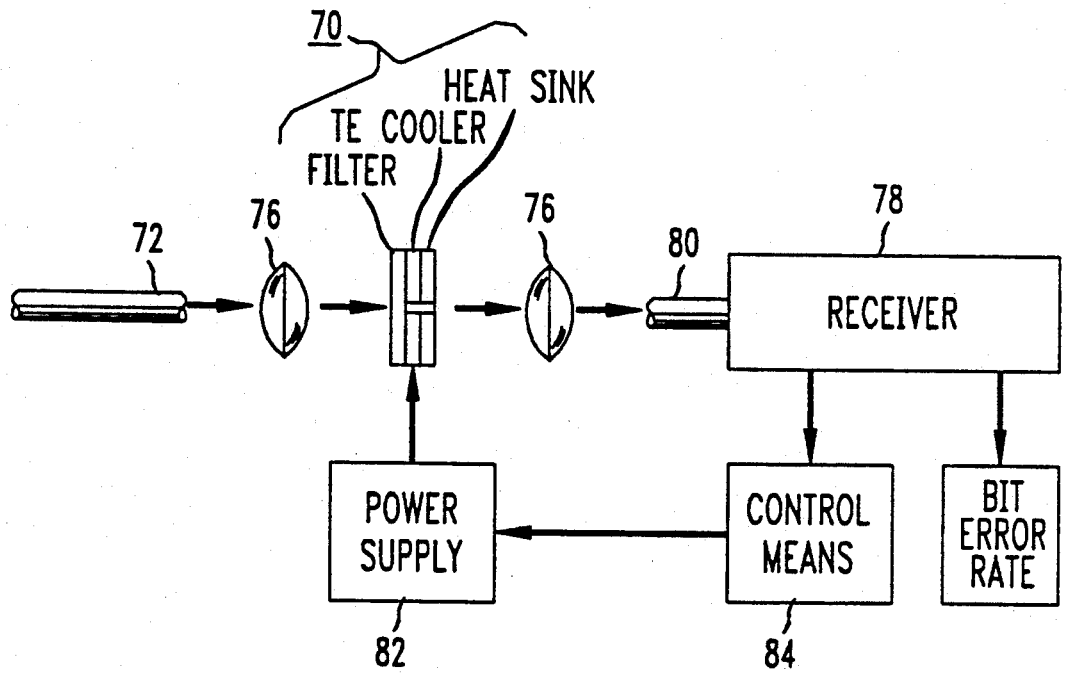
FIG. 7 illustrates structure for isolating a single channel from a multiple number of a wavelength-division-multiplexed optical communication system in accordance with the principles of the invention.

Referring to FIG. 7, there is illustrated structure for selecting a single channel from a multiple number of channels of a wavelength division multiplexed system in accordance with the principles of the invention. A tunable etalon filter 70 which includes a temperature control means such as a TE cooler and a heat sink as disclosed previous herein is coupled to receive a wavelength division multiplexed signal composed of a plurality of channels each having a separate frequency F1, F2, F3 . . . FM. via an optical fiber 72. The end of optical fiber can terminate with a lens 74 which directs the optical energy from the end of optical fiber to the filter 70. The optical energy passed by the filter is received by a lens 76 which directs the received optical energy to a receiver 78 via an optical fiber 80 or via open space. A source of energy 82 such as a power supply is coupled to supply energy to the TE cooler. A control means 84, coupled to detect the level of the signal at receiver 78, controls the energy supplied by power supply 82 to the TE cooler. In the structure of FIG. 7, the control means 84 monitors the photocurrent for maximum signal to control the temperature of the filter. The control means 84 adjusts the temperature of the filter to obtain maximum signal.

In operation, the filter is rotated, relative to the longitudinal axis of the optical fiber and, therefore, the received optical signal to set the external incident angle to tune the filter to a desired optical channel of a specific wavelength. At this instant, if desired, the filter can be locked in position so that the incident angle cannot be changed. Thereafter, fine adjustments are made by changing the temperature of the filter. In this invention, the temperature induced tuning was found to be independent of the cavity length. This is an important practical consideration for tandem arrangements of several etalons with different cavity lengths.

Thus, there has been provided, in accordance with the present invention, a tunable optical filter that satisfies the objects, aims and advantages which are desired. While the invention has been described in conjunction with a specific embodiment thereof, it is evident that many alternatives, modifications and variations will be apparent to those skilled in the art in light of the foregoing description. Accordingly, all such alternatives, modifications and variations which fall within the spirit and broad scope of the appended claims will be embraced by the principles of the invention .

I claim:

1. A tunable etalon filter comprising
spacer means having a temperature dependent coefficient of index of refraction which has a value greater than about $-0.55 \times 10^5/°C$. and less than about $9.7 \times 10^{-3}/°C$.,
a first reflecting means coupled to a surface of said spacer means,
a second reflecting means coupled to an opposing surface of said spacer means, and
means for controlling the temperature of said spacer means to control its index of refraction.

2. The tunable etalon filter of claim 1
where said spacer means is transparent to energy in the spectral region of the passband of the filter.

3. The tunable etalon filter of claim 1
where said spacer is transparent in the 1.5 μm spectral region.

4. The tunable etalon filter of claim 2
wherein said spacer means is zinc sulfide.

5. The tunable etalon filter of claim 2
wherein said first and second reflecting means are alternate layers of high and low index of refraction material.

6. The tunable etalon filter of claim 4
wherein said first and second reflecting means are alternate layers of zinc sulfide and thorium fluoride.

7. The tunable etalon filter of claim 6 wherein said spacer means is about 100 layers of zinc sulfide.

8. The tunable etalon filter of claim 7 wherein said first and second reflecting means are of five one-quarter wavelength pairs of zinc sulfide and thorium fluoride layers.

9. The tunable etalon filter of claim 2
wherein said spacer means is silicon.

10. The tunable etalon filter of claim 9 wherein said first and second reflecting means are alternate layers of silicon and silicon dioxide.

11. The tunable etalon filter of claim 10 wherein said spacer is a silicon wafer.

12. The tunable etalon filter of claim 11 wherein said spacer is about 20 μm thick.

13. The tunable etalon filter of claim 12 wherein said first and second reflecting means are alternate layers of high and low index of refraction material.

14. The tunable etalon filter of claim 12 wherein said first and second reflecting means are three one-quarter wavelength pairs of silicon and silicon dioxide.

15. The tunable etalon filter of claim 14
wherein said means for controlling the temperature of said spacer means comprises a TE cooler.

16. The tunable etalon filter of claim 15 wherein
said TE cooler is coupled to one of said reflecting means, and
said TE cooler supports an aperture for passing energy in the spectral region of the passband of the filter.

17. The tunable etalon filter of claim 15 further comprising
a first optical fiber coupled to direct an optical signal of at least two discrete frequencies to said filter, a second optical fiber coupled to receive an optical signal from said filter and,
tuning means coupled to said filter to tune said filter to pass one of said at least two discrete frequencies.

18. The tunable etalon filter of claim 17 wherein
said tuning means comprises means to angularly position said filter relative to the longitudinal axis of the optical fiber to tune the filter to an optical signal.

19. The tunable etalon filter of claim 18 wherein said tuning means comprises a source of energy coupled to said TE cooler to further tune the filter to the optical signal by controlling the temperature of said filter.

* * * * *